US 6,502,341 B1

(12) United States Patent
Truc

(10) Patent No.: US 6,502,341 B1
(45) Date of Patent: Jan. 7, 2003

(54) CARDBOARD-PLASTIC SLIDE MOUNT

(75) Inventor: James A. Truc, Eden Prairie, MN (US)

(73) Assignee: Eastman Kodak, Rochester, NY (US)

( * ) Notice: Subject to any disclaimer, the term of this patent is extended or adjusted under 35 U.S.C. 154(b) by 0 days.

(21) Appl. No.: 09/504,488

(22) Filed: Feb. 15, 2000

Related U.S. Application Data

(63) Continuation-in-part of application No. 08/534,110, filed on Sep. 26, 1995.

(51) Int. Cl.[7] ................................................ A47G 1/06
(52) U.S. Cl. ............................................ 40/702; 40/709
(58) Field of Search .......................... 40/700, 701, 702, 40/703, 768, FOR 59.2, 709

(56) References Cited

U.S. PATENT DOCUMENTS

| 1,467,108 A | | 9/1923 | Hodgson | |
|---|---|---|---|---|
| 1,500,025 A | | 7/1924 | Mayer | |
| 2,184,007 A | | 12/1939 | Staehle | 88/26 |
| 2,227,973 A | | 1/1941 | Hood | 88/26 |
| 2,268,529 A | | 12/1941 | Stiles | 40/152 |
| 2,338,189 A | | 1/1944 | Libby et al. | 156/108 |
| 2,351,877 A | * | 6/1944 | Rabkin et al. | 40/701 |
| 2,390,053 A | | 12/1945 | Bradford | 88/26 |
| 2,697,889 A | | 12/1954 | Heim | 40/152 |
| 2,842,883 A | | 7/1958 | Folwell et al. | 40/158 |
| 3,035,364 A | | 5/1962 | Hoogesteger | 40/152 |
| 3,077,688 A | | 2/1963 | Friedman et al. | 40/158 |
| 3,195,434 A | * | 7/1965 | Dietz | 40/701 |
| 3,284,939 A | | 11/1966 | Perrot | 40/152 |
| 3,341,960 A | | 9/1967 | Florjancic et al. | 40/152 |
| 3,369,338 A | | 2/1968 | Koeppe et al. | 53/35 |
| 3,470,642 A | | 10/1969 | Mundt et al. | 40/152 |
| 3,470,643 A | | 10/1969 | Koeppe et al. | 40/152 |
| 3,478,456 A | | 11/1969 | Mundt et al. | 40/152 |
| 3,521,423 A | | 7/1970 | Koeppe et al. | 53/23 |
| 3,952,434 A | | 4/1976 | Florjancic | 40/152 |
| 3,990,932 A | * | 11/1976 | Dupire | 156/230 |
| 3,996,683 A | * | 12/1976 | Hanke | 40/701 |
| 4,104,818 A | | 8/1978 | Hrabik | 40/152 |
| 4,249,328 A | | 2/1981 | Plumadore | 40/158 |
| 4,250,641 A | | 2/1981 | Thompson | 40/158 |
| 4,451,998 A | | 6/1984 | Philipp | 40/152 |
| 4,467,541 A | | 8/1984 | Pettersson | 40/158 |
| 4,607,442 A | | 8/1986 | Desmarais et al. | 40/152 |
| 4,612,754 A | | 9/1986 | Neuhold et al. | 53/457 |
| 4,836,377 A | * | 6/1989 | Heron | 40/701 |
| 5,057,407 A | | 10/1991 | Okamura et al. | 430/531 |
| 5,364,487 A | | 11/1994 | Friske et al. | 156/309.9 |
| 5,392,548 A | | 2/1995 | Truc et al. | 40/159.2 |
| 5,429,700 A | | 7/1995 | Hudson | 156/253 |

FOREIGN PATENT DOCUMENTS

| GB | 503937 | 4/1939 | ................. 40/152 |
|---|---|---|---|
| GB | 2 086 610 | 5/1992 | |

* cited by examiner

Primary Examiner—Jack Lavinder
Assistant Examiner—Thomas J. Williams

(57) ABSTRACT

A cardboard-plastic slide mount includes a cardboard bottom, a cardboard cover and a plastic brace between the bottom and the cover. The cardboard bottom and the cardboard cover include aligned film windows. The cover and bottom have a plastic coating on their inner surface, allowing the plastic brace to be bonded to the cover and base using a bonding agent. When assembled, the plastic brace is located between the bottom and the cover to define a film nest for containing a film transparency.

30 Claims, 10 Drawing Sheets

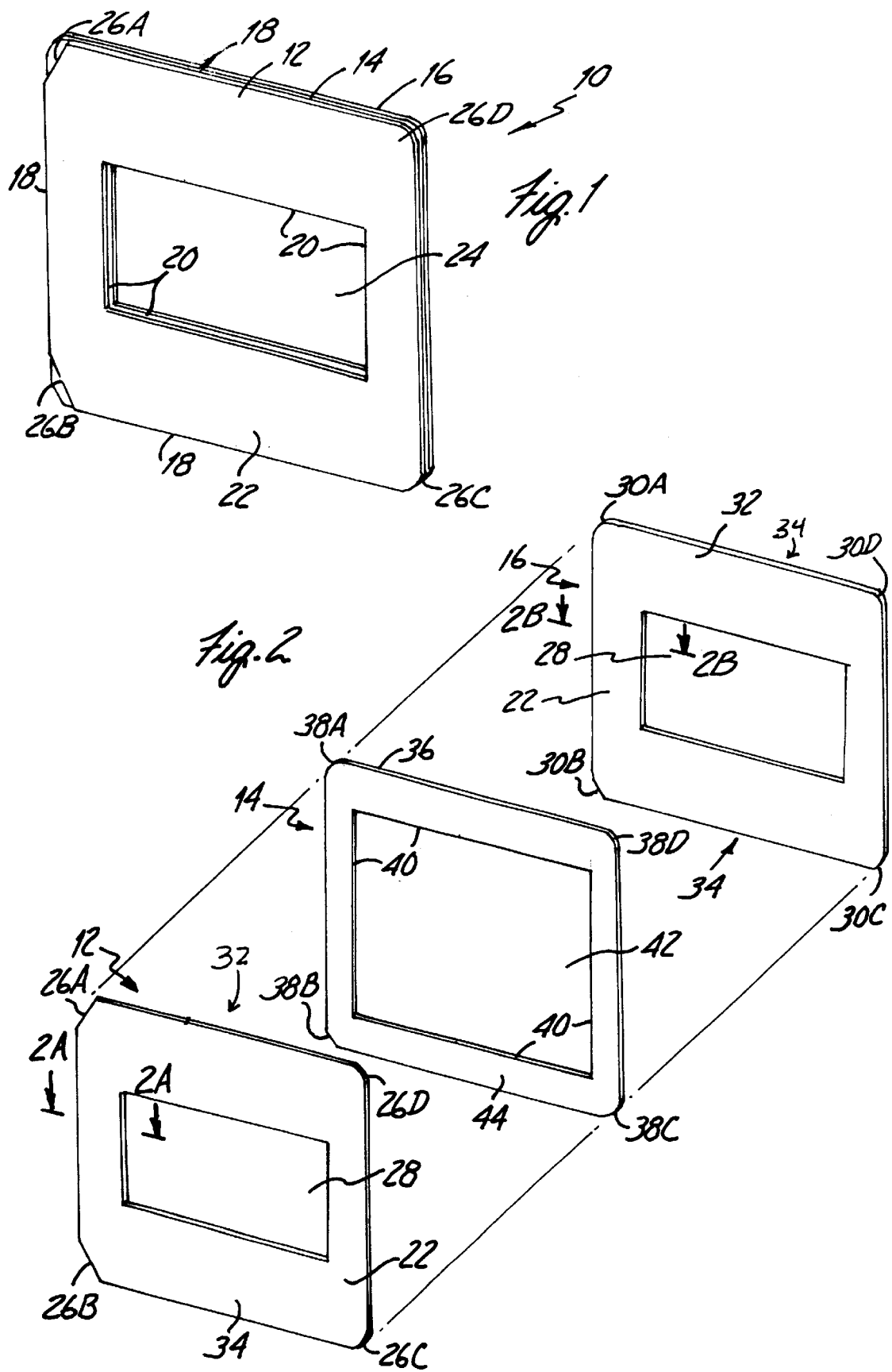

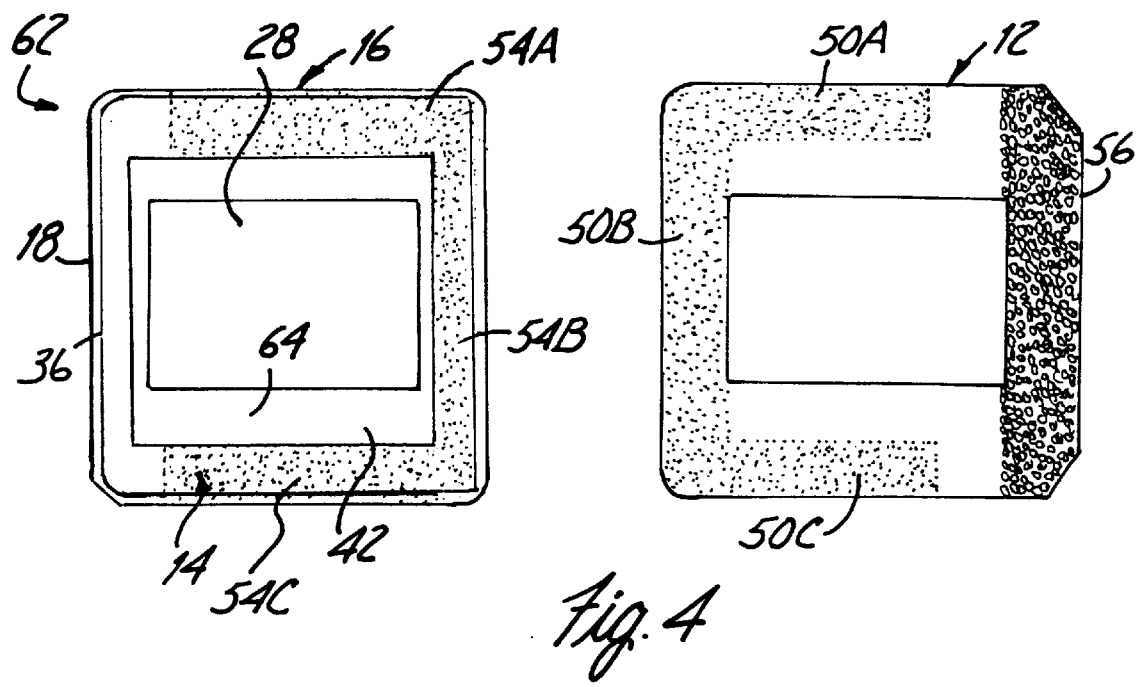
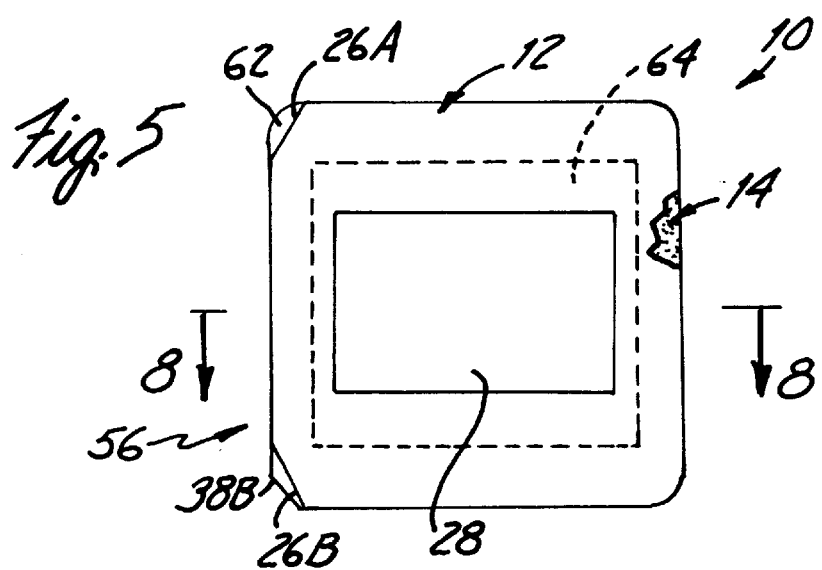

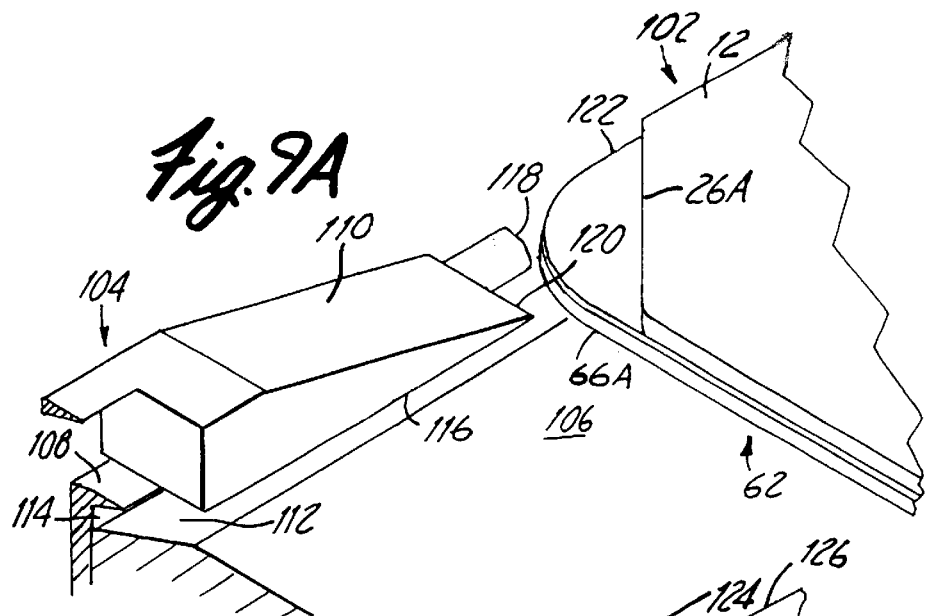
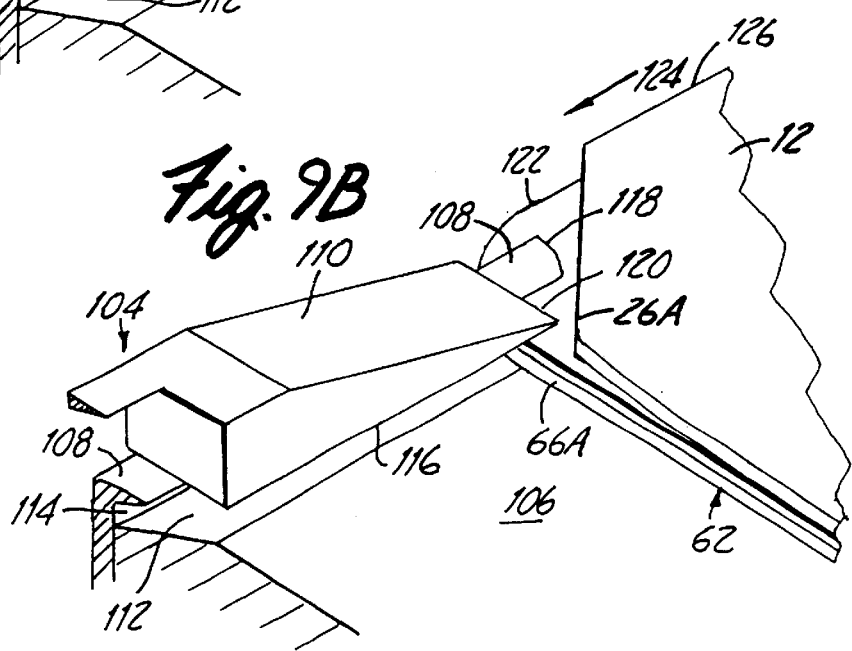
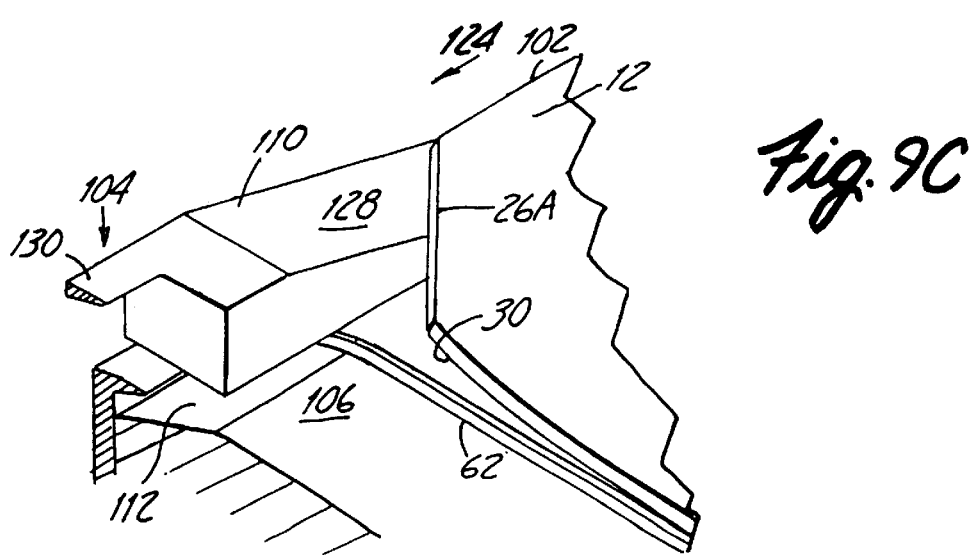

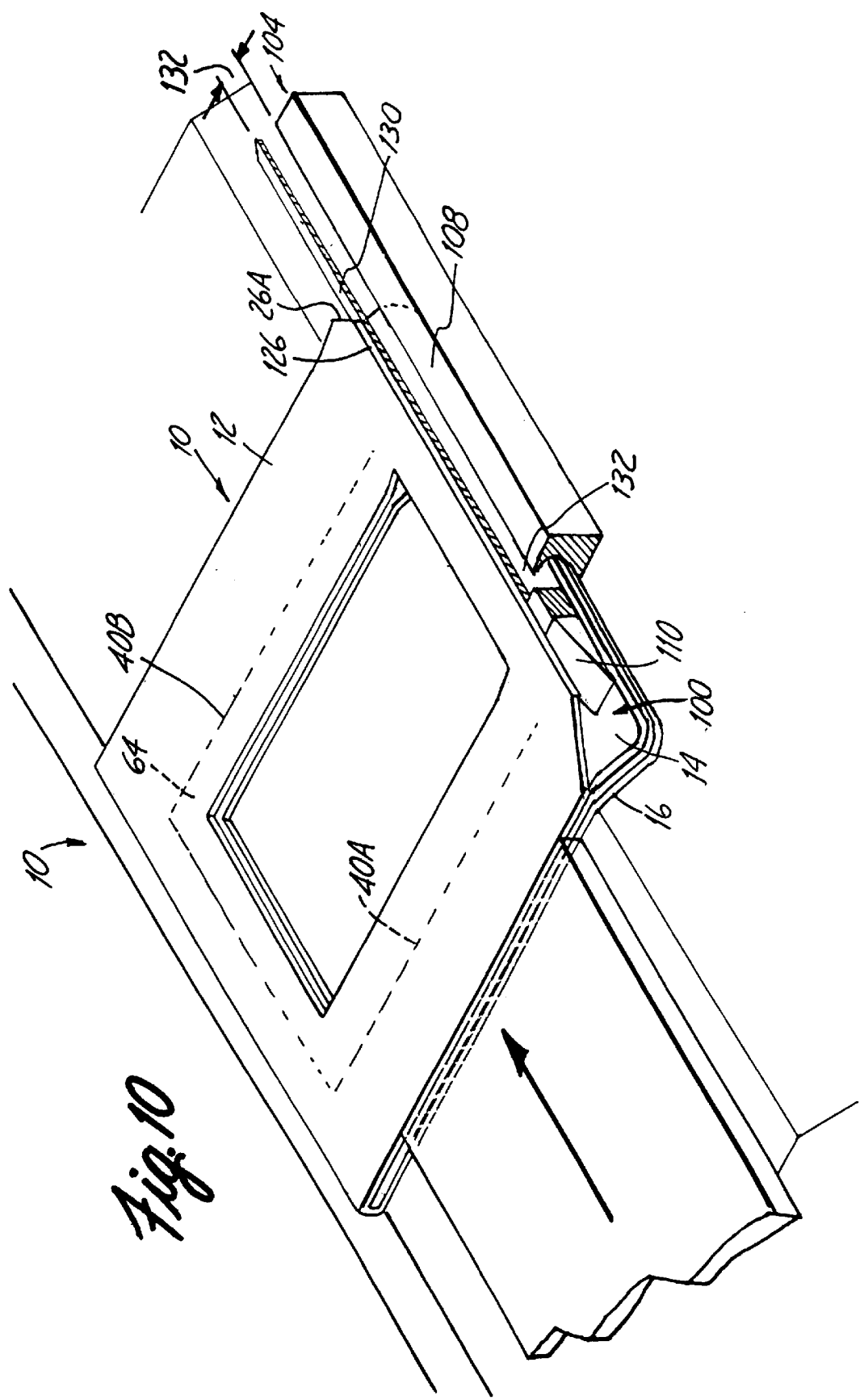

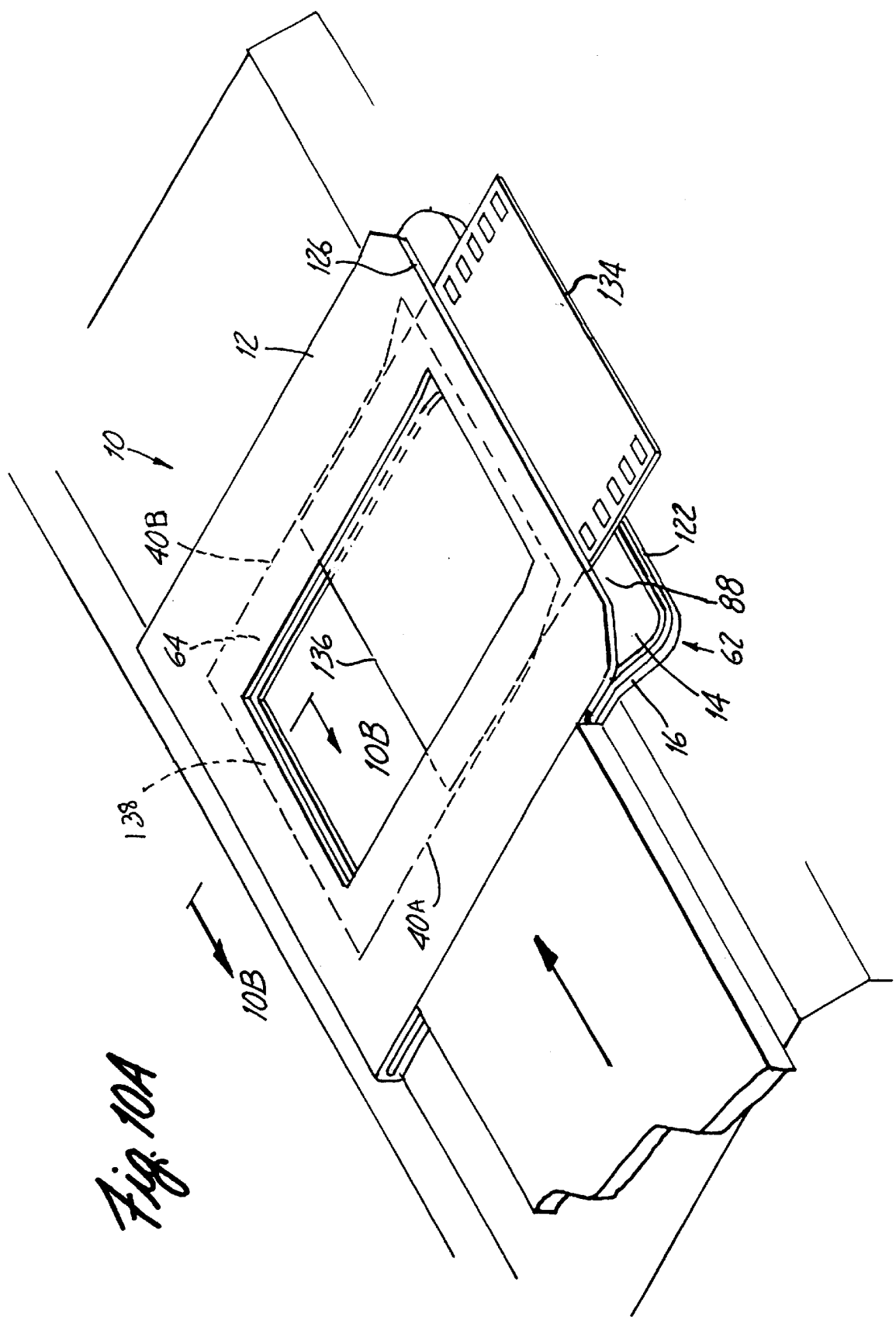

CARDBOARD-PLASTIC SLIDE MOUNT

CROSS-REFERENCE TO RELATED APPLICATIONS

This is a continuation-in-part of U.S. patent application Ser. No. 08/534,110, entitled Cardboard-Plastic Slide Mount, filed by James A. Truc on Sep. 26, 1995.

BACKGROUND OF THE INVENTION

The present invention relates to a slide mount for mounting film transparencies from a photographic film web to prepare a photographic slide. In particular, the present invention relates to an improved cardboard slide mount which incorporates a plastic brace between opposing plastic coated cardboard frames.

Photographic film transparencies are generally severed from a photographic film web and are mounted in individual slide mounts to prepare photographic slides. The photographic image of the prepared photographic slide is then viewed in cooperation with a slide projector or other visualizing means.

Slide mounts used in the industry are generally made from either plastic or cardboard. Plastic slide mounts are generally formed of first and second plastic frame portions which are connected along three edges of an outer border to form a pocket therebetween. The plastic slide mounts include a central aperture which is formed by film windows in each of the first and second plastic frame portions. Plastic slide mounts also include a slit along a fourth edge of the outer border. The slit provides an opening through which a photographic film transparency is inserted into the pocket between the first and second frame portions. The fourth edge of the first and second frame portions is easily spaced apart by an opening assembly, which allows an individual film transparency to be quickly and efficiently inserted into the pocket of the slide mount.

Cardboard slide mounts are typically significantly less expensive than plastic slide mounts. Cardboard slide mounts are generally formed by first and second frame portions which are connected by a hinge. A cardboard spacer is usually glued to an inner surface of the first frame portion so as to create a nest for the film transparency around a central rectangular aperture of the slide mount. With the first and second frame portions open in a butterfly-like position, the film transparency is placed in the film nest. The second frame portion is then folded atop the first frame portion, and the opposing inner surfaces of the first and second frame portions are glued together about all four edges of the slide mount to secure the film transparency therein. This method of loading a film transparency into a cardboard slide mount is typically relatively slow as compared to the previously described method of loading a plastic slide mount.

With the film transparency secured within the slide mount, a photographic image of the film transparency should align with the film windows of the first and second frame portions. Thus, it is important that the film transparency be correctly aligned and secured within the slide mount with the entire photographic image visible through the aperture of the slide mount. In some cardboard slide mounts, however, the film transparency is left unconnected within the film nest so that the photographic image can shift and become partially obscured by the rectangular aperture.

It is also important that the film transparency be capable of adapting to temperature variations occasioned by the intense heat of a light source of a slide projector. In some cardboard slide mounts, the film transparency is secured to the slide mount about all four edges of the film. When such a slide mount is placed in the slide projector's light source, extreme heat from the light source causes the film to expand and buckle, which in turn causes the projected photographic image to become out of focus.

SUMMARY OF THE INVENTION

The present invention is a cardboard-plastic slide mount and a method of forming the same. The cardboard-plastic slide mount includes a cardboard bottom, a plastic middle portion, or brace, and a cardboard cover. The plastic brace gives the slide mount strength and resiliency. The inner surfaces of the bottom and cover are coated with a thin layer of plastic material. This plastic coating provides a smoother surface on the inside of the slide mount, which allows a piece of film transparency to be more easily inserted into the slide mount.

The middle brace is constructed of plastic and is secured to the inner surfaces of the bottom and the cover by bonding the plastic brace to the plastic coating on the cardboard bottom, the cardboard cover, or both using a bonding agent. Creating the slide mount using a bonding agent, rather than glue, reduces or eliminates the cost of glue making the slide mount cheaper to manufacture. In addition, glue may come loose or may react with the film transparency. However, the plastic bonding method used in the present invention creates a more permanent bond and is less reactive, and thus less likely to damage the film transparency.

The brace is bonded to the bottom cardboard on all four sides. The cardboard cover is then affixed to the brace on three sides, leaving an opening through which a piece of film transparency can be inserted. The bottom, brace, and cover each have an opening, or film window. When the brace is secured between the bottom and cover, the film windows of the bottom, cover, and brace are aligned so that a piece of film transparency mounted in the slide mount can be viewed through a central aperture created by the film windows of the bottom, cover, and brace. A secondary adhesive layer may be added to the inner surfaces of the cardboard cover and bottom, so that once inserted, the piece of film transparency is held in place.

When secured between the bottom and cover, the plastic brace creates a film nest between the bottom and cover. The insertion opening communicates with the film nest and allows a piece of film to be inserted through the opening and into the film nest. The secondary adhesive layer can be positioned in the film nest along the film window of the cover so as to hold one edge of the film transparency when the film transparency is positioned in the film nest. The cardboard-plastic slide mount of the present invention is therefore able to be quickly loaded with a piece of film through the insertion opening in a manner similar to plastic slide mounts. Once loaded, the adhesive layer in the film nest secures only one edge of the film transparency, which allows the film transparency to expand without buckling when exposed to the heat of a slide projector's light source.

BRIEF DESCRIPTION OF THE DRAWINGS

FIG. 1 is an enlarged perspective view of a cardboard-plastic slide mount of the present invention.

FIG. 2 is an exploded view of the cardboard-plastic slide mount of the present invention.

FIG. 4 is partially assembled top view of the cardboard-plastic slide mount of FIG. 3.

FIG. 5 is a completely assembled top view of the cardboard-plastic slide mount of FIG. 4.

FIGS. 9A–9C are greatly enlarged perspective views of a corner of the cardboard-plastic slide mount of FIG. 5 as it enters an slide mount opening assembly.

FIG. 10 is an enlarged perspective view of the cardboard-plastic slide mount of FIG. 5 positioned on a slide mount opening assembly near a position for insertion of a film transparency.

FIG. 10A is an enlarged perspective view of the cardboard-plastic slide mount of FIG. 10 with the slide mount opening assembly partially removed to demonstrate insertion of a film transparency.

DETAILED DESCRIPTION

Figure 2A:
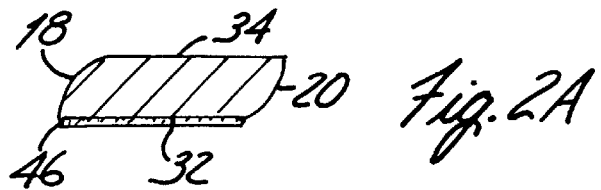
FIGS. 2A–2B are cross-sectional views of the cardboard-plastic slide mount of FIG. 2 taken along lines 2A—2A and 2B—2B, respectively.

FIG. 1 is a perspective view of a slide mount 10 of the present invention. Slide mount 10 generally includes a cardboard cover 12, brace 14, and bottom 16. Slide mount 10 also includes outer edges 18 and inner edges 20, which generally define a rectangular border 22. Inner edges 20 further define a central aperture 24, which extends through the cover 12, brace 14, and bottom 16. The central aperture 24 is also rectangular in shape, and provides a crisp edge for a projected picture when the cardboard slide mount 10 is in use. In one embodiment, two corners 26A, 26B of the cover 12 are chamfered, while two corners 26C, 26D are radiused.

FIG. 2 is an exploded view of the slide mount 10 of FIG. 1. Shown in FIG. 2 are the cover 12, brace 14, and bottom 16. The cover 12 includes a film window 28, radiused corners 26C, 26D, and chamfered corners 26A, 26B. The bottom 16 is generally a mirror image of the cover 12, having a similar film window 28. The bottom 16 differs from the cover 12 in that all four corners 30A–30D are radiused. The chamfered corners 26A, 26B on cover 12 allow a film transparency to be loaded more easily into the slide mount when using a slide mount opening assembly. The two chamfered corners 26A, 26B permit the cardboard slide mount 10 to be opened by two directions of travel through an opening assembly, which is described more fully below.

The cover 12 and bottom 16 each have an inner surface 32 and an outer surface 34. The inner surface 32 is that surface which faces the brace 14 when the slide mount 10 is assembled. The outer surface 34 is opposite the inner surface 32, and is the surface which does not contact the brace 14 when the slide mount 10 is assembled. The inner surfaces 32 of the cover 12 and bottom 16 are coated with a thin layer of plastic. The outer surfaces 34 of the cover 12 and bottom 16 are not coated with plastic, which allows the outer surfaces 34 of the slide mount 10 to be easily written upon.

The thickness of the cardboard used in the cover 12 and bottom 16 is preferably about 0.020 millimeters. In one embodiment, the cover 12 and bottom 16 are formed from SBS-MD bleach stock cardboard having a plastic coating on one surface. Any suitable cardboard material may be used which has a thin layer of plastic, lamination, or similar material on one surface. The plastic layer makes the surface of the cardboard smoother and gives the surface a lower coefficient of friction, which eases the insertion of a film transparency into the slide mount.

The brace 14 is positioned between the cover 12 and bottom 16 and is formed from a generally flat layer of plastic material, such as polystyrene. The plastic brace 14 includes an outer edge 36, which defines corners 38A–38D, and an inner edge 40, which defines a brace film window 42. The area of plastic between the outer edge 36 and the inner edge 40 forms a border 44. The film window 42 on the brace 14 is larger than the film windows 8 on the cover 12 and bottom 16, so that the border 44 of the plastic brace 14 is narrower than the borders 22 of the cover 12 and bottom 16. The film window 42 in the brace 14 defines a film nest 64 (shown in FIG. 4) that is generally sized to accept an individual film transparency or piece of film. As a result, the brace 14 also serves as a spacer. Alternatively, brace 14 may be secured between the cover 12 and bottom 16 in addition to a distinct cardboard spacer.

As can be appreciated, the brace 14 may be formed from a variety of plastics. Preferably, the plastic chosen has a consistent thickness and a degree of rigidity sufficient to prevent undue warpage of the slide mount 10. The brace 14 preferably has a thickness of about 0.008 millimeters. The brace 14 also has a chemical inertness such that the brace 14 will not chemically interact with or affect a film transparency. The plastic brace 14 is typically formed from a sheet of plastic which is then cut and dimensioned so as to fit between the cover 12 and bottom 16. Alternatively, the brace 14 may be formed by laminating or coating a plastic material between the cover 12 and the bottom 16 and then allowing the plastic material to harden into a solid plastic layer. The plastic brace 14 when so formed is in addition to the plastic coating found on the inner surfaces 32 of the cardboard cover 12 and bottom 16.

Because the brace 14 is formed from plastic material, the slide mount 10 is strong, resilient, and manufactured at a lower cost. The brace 14 rigidifies and strengthens the structural integrity of the slide mount 10, making the slide mount 10 less likely to be accidentally bent, torn, or otherwise damaged. The plastic brace 14 also prevents corresponding warpage of the film transparency. At the same time, the brace 14 does not increase the overall thickness of the slide mount 10, thus ensuring that the slide mount 10 easily inserts within the selected image projecting apparatus.

In addition, because plastic material has shape memory, the plastic brace 14 returns the slide mount 10 to its original shape despite accidental or intended temporary deformation of the slide mount 10. This is extremely advantageous in preclosed slide mounts which may require that an edge portion of the slide mount be temporarily bent or deformed to permit insertion of a film transparency. As a result, once the film transparency is inserted into a preclosed slide mount having the brace 14, the portion temporarily bent or deformed for the insertion will return to its original shape to capture the film transparency. Also, because the plastic material forming the brace 14 is generally smoother and has lower coefficients of friction than cardboard, the brace 14 provides a better edge for guiding insertion of the film transparency into the slide mount 10.

Moreover, the plastic brace 14 also enables slide mounts 10 to be produced with less scrap and at a lower cost. Approximately 40% of the cost of producing slide mounts is associated with scrap materials from the production process. A major source of scrap material is the material cut away or removed to form the film windows 28 on the cover 12 and bottom 16, as well as the film window 42 on the brace 14. Typically, the cardboard material cut away to form the windows 28 on the cover 12 and bottom 16 must be transported to one type of recycling facility, such as a paper plant, to be recycled, while the material cut away from the film window 42 in the brace 14 must be recycled or disposed someplace else. Because brace 14 is formed from a plastic material, the plastic material removed to form opening 42 may be simply reground on site and reused. As a result, recycling of the plastic scrap from brace 14 is simple and less expensive. Brace 14 enables slide mount 10 to be produced at a reduced cost.

Figure 2B:
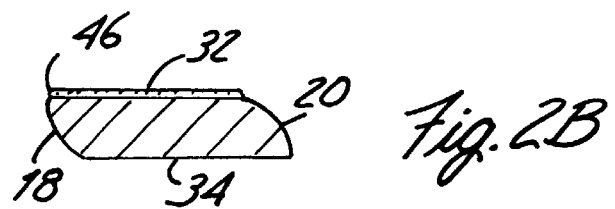

FIGS. 2A–2B are cross-sectional views of the cardboard slide mount 10 of FIG. 2. FIGS. 2A and 2B are cross sectional views of the cover 12 and bottom 16 showing the outer surface 34 and inner surface 32. A thin plastic layer 46 is located on the inner surface 32 of both the cover 12 and bottom 16. The cross sectional views also show the outer edge 18 and inner edge 20 of the cover 12 and bottom 16. As seen in FIG. 1, the outer edge 18 forms the outer edge of the slide mount 10, while the inner edge 20 forms the film window 28.

The cover 12 and bottom 16 are preferably formed by a cutting die or mechanism which performs two cuts; one to create the outer edge 18 and one to create the inner edge 20. In forming the outer edge 18, the cutting die cuts in a direction from the inner surface 32 to the outer surface 34 of the cardboard. As a result of this cutting direction, outer edge 18 is slightly curved. In forming the inner edge 20, the cutting die cuts in an opposite direction, moving from the outer surface 34 to the inner surface 32. The result is a similar curve on the inner edge 20. The orientation of the above-described cuts is such that the grain of the cardboard runs generally from plastic brace 14 to cover 12. The curved edges 18, 20 allow a piece of film transparency to more easily be inserted into the slide mount 10.

Figure 3:
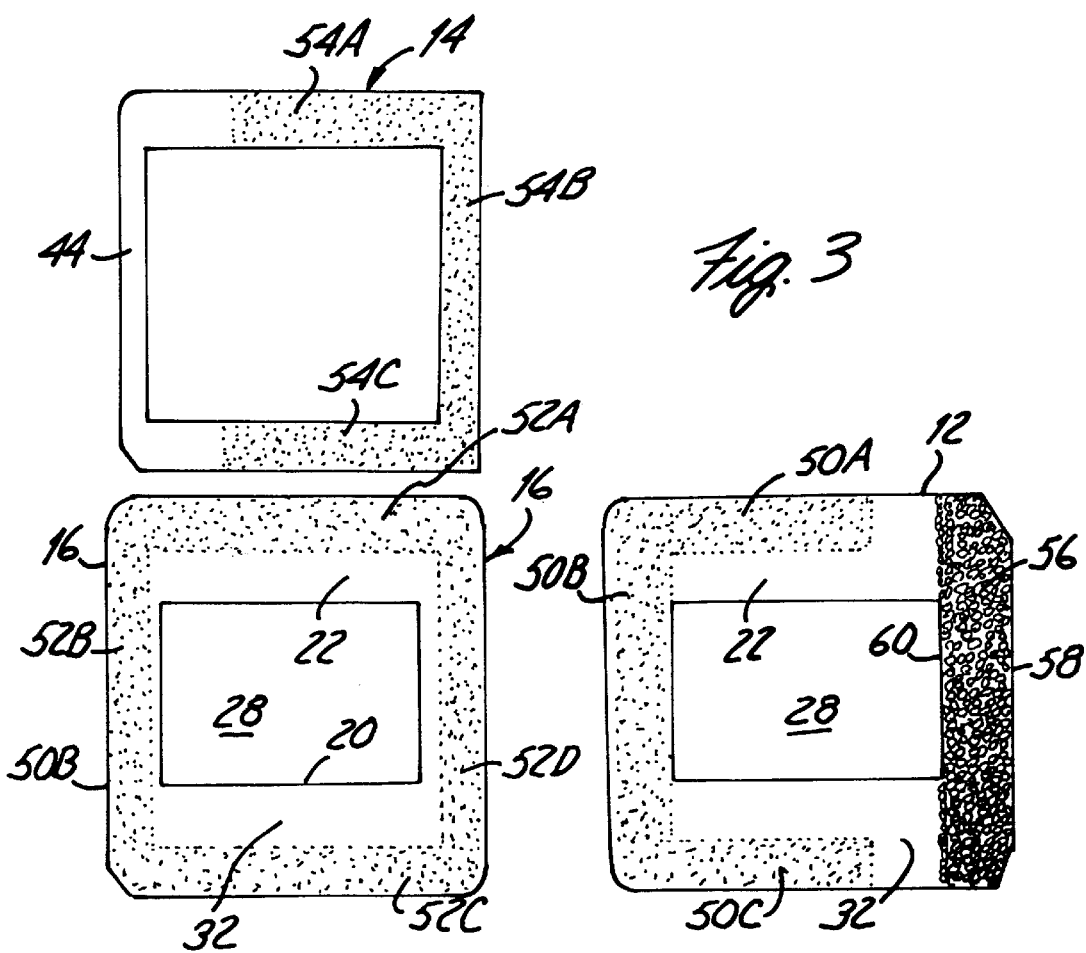
FIG. 3 is a top view of the cardboard-plastic slide mount of FIG. 2 showing the areas to which a bonding agent can be applied to the cardboard.

FIG. 3 is a top view of cardboard slide mount 10 in an unassembled state. Visible in FIG. 3 are cover 12, brace 14, and bottom 16. The cover 12 and bottom 16 are positioned so that the inner surface 32 of both is visible. When assembled, the brace 14 is placed on the bottom 16, and the cover 12 placed over the bottom 16 and brace 14 so that the brace 14 is sandwiched between the cover 12 and bottom 16. On the inner surface 32 of the cover 12 are located bonding regions 50A–50C. Similarly, bonding regions 52A–52D appear on the bottom 16, and bonding regions 54A–54C are located on the brace 14. Though only the top bonding regions 54A–54C are visible, brace 14 has bonding regions on both its top and bottom surfaces. The bonding regions 54A–54C on the top surface of brace 14 form a U-shape, while the bonding regions on the bottom surface of brace 14 form a square shape similar to the bonding regions 52A–52D located on the bottom 16. The cover 12 has a secondary adhesive region 56.

Bonding regions 50A–50C on the cover 12 form a U-shaped pattern located on three sides of the border 22 of the cover 12. The leg portions 50A, 50C of the U-shaped bonding regions 50A–50C of the cover 12 are spaced from the outer edge 58 of the cover 12 by about 0.624 inches. The pattern of bonding regions 54A–54C located on the plastic brace 14 mirror the bonding regions 50A–50C on the cover 12. In contrast, bonding regions 52A–52D on the bottom 16 are located on all four sides of the border 22 of the bottom 16. Because the border 44 of the brace 14 is narrower than the border 22 of the cover 12 and bottom 16, the bonding regions 52A–52D on the bottom 16 are spaced from the inner edge 20 of the bottom 16.

The bonding regions 50A–50C, 52A–52D, 54A–54C on cover 12, bottom 16, and brace 14, respectively, are the areas to which a bonding agent or adhesive can be applied to connect the cover 12, bottom 16, and brace 14. Because the inner surfaces 32 of the cover 12 and bottom 16 have a plastic coating, a bonding agent can be used to create a plastic to plastic bond. One suitable bonding agent is acetone. The acetone is applied at the bonding regions and melts the plastic coating of the cover 12 or bottom 16 to the plastic brace 14, creating a bond and holding the cover 12, brace 14, and bottom 16 together. Other suitable plastic to plastic bonding methods may be used, including an ultrasonic welding process. In addition to using a bonding agent, it may be desirable to use an adhesive as well to form one of the connections between the cover 12, brace 14, and bottom 16.

A secondary adhesive may be used at secondary adhesive region 56 on the cover 12. The secondary adhesive region 56 on cover 12 is a strip of adhesive located along the outer edge 58 of the cover 12. The secondary adhesive region 56 extends along the length of the outer edge 58 and fills the width between the outer edge 58 and the inner edge 60. The secondary adhesive strip 56 preferably has a width of approximately 0.3 inches. In one embodiment, the secondary adhesive region 56 is a pressure-activated, microencapsulated adhesive, commonly known in the art.

The secondary adhesive region 56 performs two main functions. First, the secondary adhesive region 56 holds the slide mount 10 closed once a film transparency has been inserted. Second, the secondary adhesive region 56 catches one edged of the film transparency. The secondary adhesive region 56 thus also functions to hold the film transparency in place so that it remains optimally positioned in the film window 28. The secondary adhesive region 56 secures only one edge of the film transparency, which allows the film transparency to expand without buckling when exposed to the heat of a slide projector's light source.

In one embodiment, acetone is applied to the bottom surface of the brace 14 (at bonding regions which mirror the bonding regions 52A–52D shown on the bottom 16). The brace 14 is then bonded to the bottom 16 along bonding regions 52A–52D. The cover 12 is prepared by applying an adhesive to the cover 12 at secondary adhesive region 56. Next, acetone is applied to the cover 12 at the bonding regions 50A–50C. The cover 12 is placed on the bottom 16 and brace 14, allowing a plastic to plastic bond to occur which holds the cover 12, brace 14, and bottom 16 together. A small amount of pressure may be used to assure alignment and a proper connection. The acetone does not interfere with the secondary adhesive region 56, as a result, the cover 12 remains unbonded along the secondary adhesive region 56.

As can be appreciated, the bonding regions and the secondary adhesive region 56 may alternatively or additionally be placed in other configurations or patterns on cover 12, brace 14, and bottom 16. Likewise, a variety of other methods may be employed to affix cover 12, brace 14 and bottom 16 together. For instance, it is possible to create a plastic to plastic bond between the brace 14 and bottom 16, but use an adhesive when attaching the cover 12. Similarly, it may be possible to create a plastic to plastic bond between the cover 12 and brace 14, while using an adhesive to attach the bottom 16. In addition to the bonding agent disclosed, any other suitable bonding method could perform the plastic to plastic bonding functions described herein.

The plastic to plastic bonding which occurs between the plastic coating on the inner surfaces of the cover 12 or bottom 16 and the plastic brace 14 is an improvement over previous cardboard slide mounts. The plastic to plastic bonding method reduces or eliminates the use of glue to hold the cover 12, brace 14, and bottom 16 together, which results in a less expensive end product. In addition, glue may loosen over time or in varying environmental conditions; the plastic to plastic bond is more permanent and is less likely to come loose. Finally, glues may adversely react with the film transparency, whereas the plastic bonding process reduces the risk of the film transparency being adversely affected.

FIG. 4 is a top view of a partially assembled slide mount 10. Visible in FIG. 4 are the cover 12 and bottom 16 with plastic brace 14 bonded to the inner surface 32 of the bottom 16. Once the brace 14 is bonded to the bottom 16, the two form a base 62. As shown in FIG. 4, the brace 14 is dimensioned so that the outer edge 36 of the brace 14 does not extend beyond the outer edge 18 of the bottom 16 and cover 12 when the cardboard slide mount 10 is fully assembled. This assures that the outer edge 36 of the plastic brace 14 does not extend beyond the outer edge 18 of the bottom 16 in the event it and the cover 12 are slightly misaligned when assembled. The opening 42 of the plastic brace 14 frames the film window 28 of the bottom 16 to create a film nest 64 on the base 62.

FIG. 5 is a top view of a fully assembled cardboard slide mount 10 once the cover 12 is placed atop the base 62. When the cover 12 is placed atop the base 62, a bonding agent is used to create a bond between the cover 12 and brace 14 along three sides of the slide mount 10. No bond is created on the fourth side, leaving an opening through which a film transparency can be inserted into the slide mount 10. The secondary adhesive region 56 is located on the side of the slide mount which remains unbonded. The secondary adhesive region 56 is not activated by the bonding agent. As a result, the cover 12 remains unbonded to the base 62 at the secondary adhesive region 56, but is removably adhered to the base 62 along the secondary adhesive region 56. Thus, the secondary adhesive region 56 permits insertion of an individual film transparency into film the nest 64, but also serves to hold the film transparency in place once so inserted. FIG. 5 also shows that two corners of the base 62 are exposed by virtue of the chamfered cut of the corners 26A, 26B of the cover 12.

Figure 6:
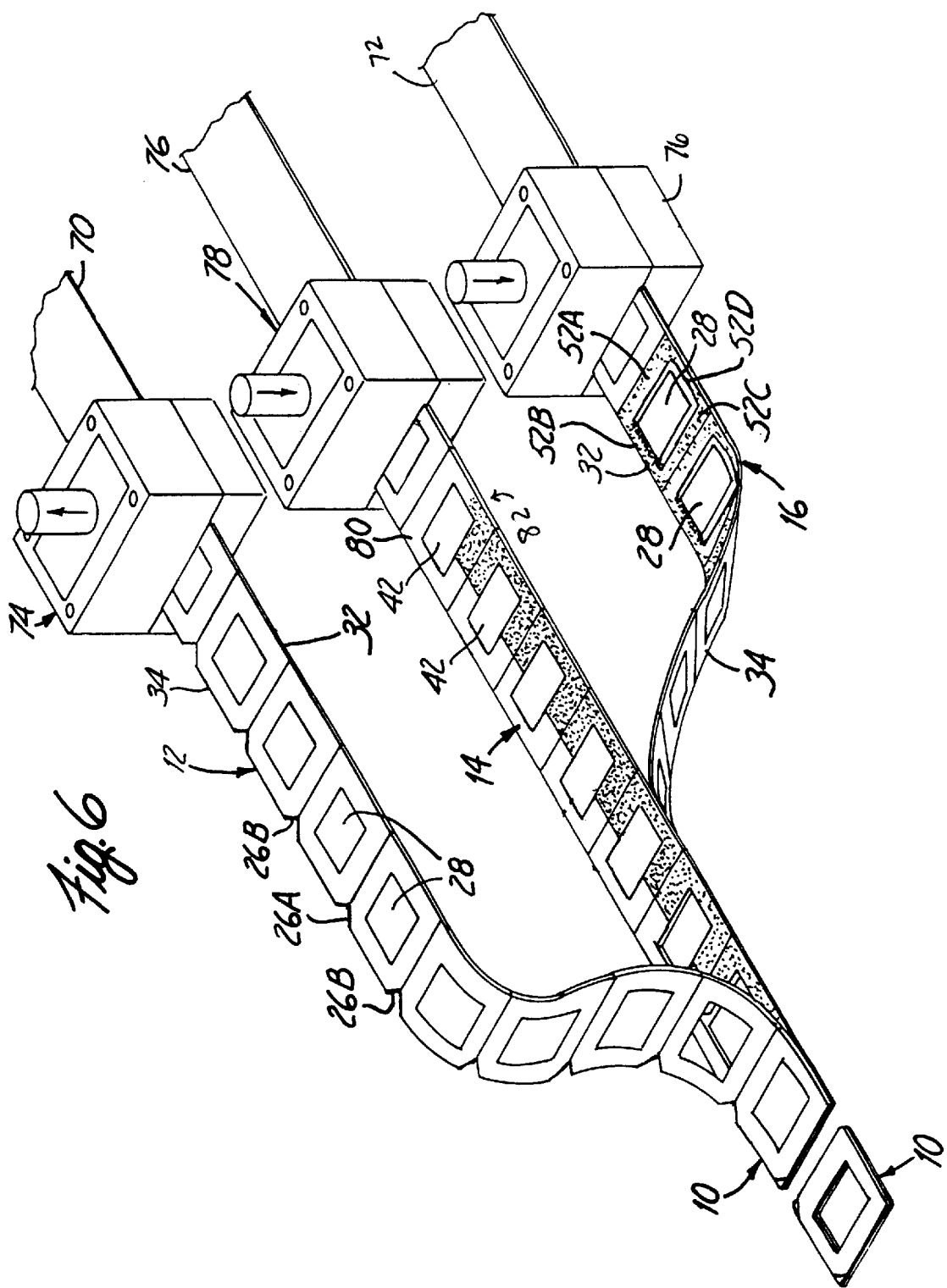
FIG. 6 is a diagrammatic illustration of a process for forming a slide mount of the present invention.

FIG. 6 is a diagrammatic illustration of one method of forming and assembling a slide mount 10. As illustrated by FIG. 6, the cover 12 and bottom 16 are formed from separate individual elongate cardboard sheets 70, 72, respectively. A cutting mechanism 74, diagrammatically shown, cuts film windows 28 through each cover 12 and also cuts corner portions of each cover 12 to form chamfered corners 26A, 26B. The cutting mechanism 74 preferably cuts in a direction upward through each cover 12 from the inner surface 32 to the outer surface 34. Similarly, a cutting mechanism 76 cuts and forms a film window 28 through each bottom 16. Preferably, the cutting mechanism 76 cuts downward through each bottom 16 of the sheet 72 in a direction from the inner surface 32 to the outer surface 34.

Because the cutting mechanism 74 cuts in a direction from the inner surface 32 to the outer surface 34 of the sheet 70, the cutting mechanism 74 forms curved surfaces at edges 18 and 20 as shown in FIGS. 2A–2B. The cutting mechanism 74 additionally cuts and removes corner portions from each cover 12 to form chamfered corners 26A, 26B in each cover 12. As can be appreciated, the cutting of aperture 28 and corners 26A, 26B may alternatively be performed by multiple distinct cutting mechanisms.

As shown by FIG. 6, plastic braces 14 are preferably formed from an elongate continuous sheet 76 of plastic material which is cut at spaced intervals by a cutting mechanism 78 (diagrammatically illustrated) to form openings 42 in the braces 14. Cutting mechanism 78 preferably cuts in a direction from the outer surface 80 to inner surface 82 of the plastic sheet 76 so that the inner edge 40 of the brace 14 has a slightly curved surface.

Once the elongate sheets 70, 72, and 76 are cut, a bonding agent or adhesive is applied to the necessary surfaces of each cover 12, bottom 16, and brace 14 so as to bond the elongate, continuous sheet of plastic material 76 containing braces 14 to the cardboard sheet 72 containing bottoms 16. Because the inner surface 32 of the sheets 70, 72 are coated with plastic, a plastic to plastic bond can be created between the sheets 70, 72 and sheet of plastic material 76. To create the plastic to plastic bond, a bonding agent may be applied in a variety of ways. Preferably, the bonding agent is applied by raising an applicator to contact the bottom surfaces of each brace 14 and cover 12. The bonding agent is applied to the braces 14 and covers 12 at the patterns shown above; at a three sided bonding region on the inner surface 32 of the covers 12 and a four sided bonding region the on brace 14, which mirrors the bonding regions 52A–52D on the bottom 16.

Once a bonding agent is applied to the sheet 76 containing plastic braces 14, the sheet 76 is positioned so as to overlay the bottoms 16 of sheet 72. Each brace 14 of sheet 76 is positioned so that each opening 42 is in at least partial alignment with opening 28 of each bottom 16. A small amount of pressure may be applied to hold the braces 14 to the bottoms 16 and to ensure a proper bond occurs. The result is a bond created by bonding agent acting on the plastic brace 14 and plastic coating located on the inner surface 32 of the bottoms 16. Next, a secondary adhesive is applied to the sheet 70 from which covers 12 are formed. Ultraviolet heat may be used to set the adhesive. A bonding agent is then applied in the pattern shown above in FIG. 3 to the sheet 70.

The covers 12 of sheet 70 are then placed so that each cover 12 overlays a corresponding brace 14 and bottom 16. Each cover 12 is placed so that an opening 28 of the covers 12 is in substantial alignment with an opening 28 of a corresponding bottom 16 and an opening 42 of a corresponding brace 14. The covers 12 are placed over braces 14 and bottoms 16 so that inner surface 32 of each cover 12 is bonded to brace 14 at the bonding regions. Similar to bonding the brace 14 to the bottom 16, a bond can be created by the bonding agent acting on the plastic brace 14 and the plastic coating located on the inner surface 32 of the cover 12. A small amount of pressure may be used to secure plastic braces 14 between corresponding covers 12 and bottoms 16. As can be appreciated, various other plastic to plastic bonding methods may be used to secure each brace 14 between its respective cover 12 and bottom 16 to form a slide mount 10. In addition, the bonding agent may be alternatively applied in other patterns or to corresponding opposite contact surfaces of a cover 12, bottom 16, and brace 14.

Once the sheet 76 containing braces 14 is bonded between the sheet 70 forming covers 12 and the sheet 72 forming bottoms 16, a composite elongate strip of slide mounts 10 is formed. The elongate strip is severed to form individual slide mounts 10 ready for receiving film transparencies. Alternatively, film transparencies may be positioned in film nest created by each plastic brace 14 and bottom 16 prior to the placing and the securing of each cover 12 on brace 14 and bottom 16. The covers 12 may then be placed atop the film transparency and secured to a plastic brace 14 and bottom 16 to at least partially secure the film transparency between the cover 12 and brace 14.

Furthermore, in lieu of forming the plastic braces 14 from a separate, distinct sheet of plastic material 76, plastic braces 14 may be formed by alternatively laminating, sputtering, or coating inner surface 32 of either the bottoms 16 or covers 12 with a plastic material which is allowed to harden into a solid plastic layer. The shape or outline of the plastic brace 14 may be defined by stenciling, by cutting and removing unwanted portions of the plastic layer, or by similar controlled deposition or removal techniques.

Figure 7:
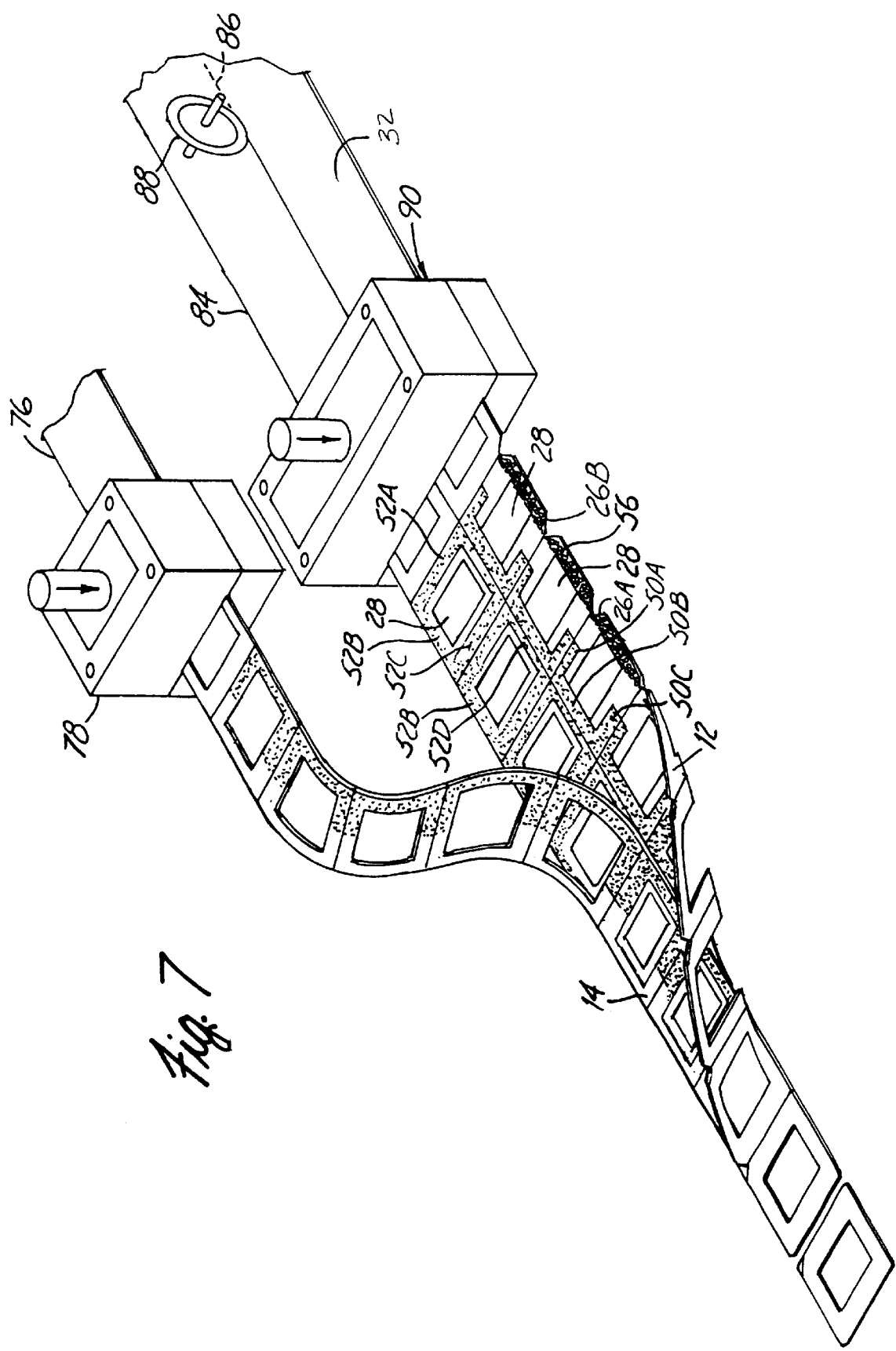
FIG. 7 is a diagrammatic illustration of an alternate process for forming the slide mount of the present invention

FIG. 7 diagrammatically illustrates an alternative method for forming slide mounts 10. As shown by FIG. 7, cover 12 and bottom 16 are formed from a single continuous sheet of cardboard 84 which is further processed to create fold line 86 dividing cover 12 and bottom 16. Preferably, the fold line 86 is formed by scoring sheet 84 with a scoring mechanism 88 as diagrammatically illustrated. Once the fold line 86 dividing the cover 12 and bottom 16 is formed, a punching mechanism 90 (diagrammatically illustrated) punches and cuts side-by-side apertures 28 in each pair of covers 12 and bottoms 16 on opposite sides of the fold line 86 in cardboard sheet 84. Because the cutting mechanism 90 cuts in a direction from inner side to outer side of sheet 84, the cutting mechanism 90 forms curved surfaces of edges 18 and 20 as shown in FIGS. 2A–2B. The cutting mechanism 90 additionally cuts and removes a corner portion from each cover 12 to form chamfered corners 26A, 26B on each cover 12. As can be appreciated, the cutting of apertures 28 and corners 26A, 26B may alternatively be performed by multiple distinct cutting mechanisms.

Once the elongate sheets from which covers 12, braces 14, and bottoms 16 are cut, a bonding agent or adhesive is applied to the necessary surfaces of each cover 12, bottom 16, and brace 14 so as to secure the elongate continuous sheet 76 of plastic material from which the braces 14 are formed to the cardboard sheet 84 from which covers 12 and bottoms 16 are formed. Because of the plastic coating on the inner surface 32 of the cardboard sheet 84, a plastic to plastic bond can be created between the sheet 76 of plastic material and cardboard sheet 84. To create a plastic to plastic bond, a bonding agent is used. As discussed above, bonding agent is applied at bonding regions on cover the 12 and bottom 16. As can be appreciated, the bonding agent may alternatively be applied to opposite contact surfaces of the cover 12, bottom 16, and brace 14, or may be applied in slightly different patters.

Once a bonding agent is applied, a secondary adhesive may be applied to the covers 12. The adhesive may be set using UV heat. Once the secondary adhesive is applied, the sheet 76 of plastic material is positioned so as to over lay the bottoms 16 of sheet 84. Each brace 14 on the sheet 76 is positioned so that each opening 42 is in at least partial alignment with the openings 28 of each bottom 16. The covers 12 of sheet 84 are folded on fold line 86 so that each cover 12 overlays a corresponding brace 14 and bottom 16. The cover 12 is folded so that the aperture 28 of cover 12 is in substantial alignment with aperture 28 and opening 42 of a corresponding bottom 16 and brace 14. Once each cover 12 is folded about fold line 86 so as to capture brace between the bottom 16 and cover 12, a small amount of pressure may be applied to ensure a proper bond occurs between the bonding regions of cover 12, brace 14, and bottom 16.

Once the sheet 76 containing the plastic braces 14 is fixedly secured or bonded between the covers 12 and bottoms 16 to form an elongate composite strip of a plurality of pre-closed slide mounts 10, the elongate composite strip is severed to separate the strip into individual pre-closed slide mounts 10 ready for receiving film transparencies. Alternatively, film transparencies may be positioned between each plastic brace 14 and cover 12 prior to folding about the fold line 86 and the securing of each cover 12 to each brace 14.

Figure 8:
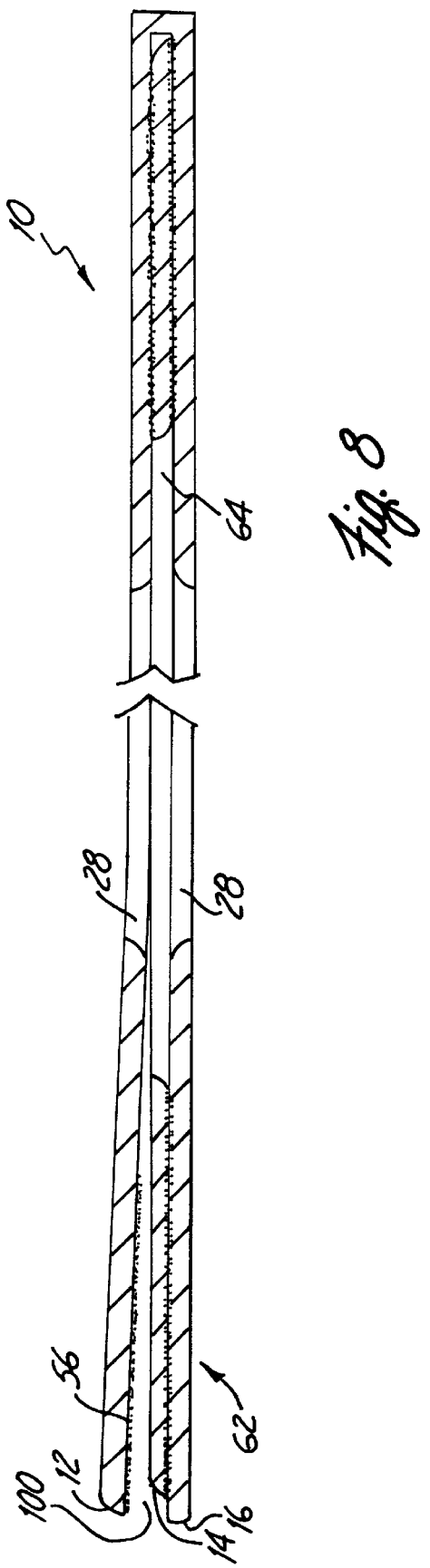
FIG. 8 is a cross-sectional view of the cardboard-plastic slide mount of FIG. 5 taken along line 8—8.

FIG. 8 is a cross-sectional view of cardboard slide mount 10 of FIG. 5 taken along line 8—8. For illustration purposes, the cover 12 is shown slightly spaced from the base 62. As shown in FIG. 8, an insertion opening 100 exists between the cover 12 and base 62. The insertion opening 100 communicates with the film nest 64, which allows an individual film transparency to be passed through the insertion opening 100 and into the film nest 64. Also visible is the secondary adhesive region 56. Once film transparency is inserted, a suitable amount of pressure is used to activate the secondary adhesive region 56.

As described above, the secondary adhesive region 56 serves two functions. First, the secondary adhesive region 56 secures an edge of the individual film transparency within film nest 64. Second, the cover 12 is adhered to the base 62 along the secondary adhesive region 56. It is important for the secondary adhesive region 56 to hold the individual film transparency in a fixed position within the film nest 64. By being secured only along the secondary adhesive region 56, the individual film transparency is capable of expanding and contracting when subjected to extreme temperatures produced by a light source of a slide projector so as to avoid any warping of the film transparency which might affect the focus of the projected picture. Likewise, it is important for the secondary adhesive region 56 to affix the cover 12 to the base 62 after the cover 12 has been slightly deformed to allow insertion of a film transparency. Cardboard slide mount 10 has a finished thickness of about 0.048 millimeters.

FIGS. 9A–9C are greatly enlarged perspective views of a cardboard slide mount 10 which demonstrate one preferred manner of preparing cardboard slide mounts 10 to accept an individual film transparency. Generally, the cover 12 is separated from the base 62 along an edge 102 so as to expose the insertion opening 100 and permit a film transparency to be inserted into film nest 64. As shown in FIG. 9A, a cardboard slide mount 10 is placed on a slide mount opening assembly 104. The slide mount opening assembly 104 generally includes a base 106, ledge 108, and wedge 110. The base 106 includes a beveled edge 112 which, as viewed in FIG. 9A, is beneath the wedge 110. The beveled edge 112 of the base 106 cooperates with the ledge 108 to form a slot 114. Wedge 110 is slightly elevated above the base 106, which permits the base 62 of a cardboard slide mount 10 to pass beneath the lower edge 116 of wedge 110. A leading edge 118 of the ledge 108 extends beyond leading edge 120 of the wedge 110 so that a corner 66A of the base 62 is engaged by the ledge 108 before the leading edge 120 of the wedge 110 engages the corner 26A of cover 12. Thereafter, the slot 114 is designed to accept an edge 122 of the base 62.

As shown in FIG. 9B, cardboard slide mount 10 moves in the direction of an arrow 124 with the leading edge 118 of the ledge 108 directing the radiused corner 66A of the base 62 into the slot 114 before the leading edge 120 of wedge 110 contacts the corner 26A of the cover 12. The slot 114 thereafter deflects the edge 122 of the base 62 downward in the direction of the beveled edge 112 of the base 106. Thus, as a result of the chamfering of corner 26A of the cover 12, the edge 122 of the base 62 is separated from an edge 126 of the cover 12 before the leading edge 120 of the wedge 110 contacts the corner 26A of the cover 12. This assures that the inner surface 32 of the cover 12 is slightly exposed before the leading edge 120 of the wedge 110 engages the inner surface 32 of the cover 12.

As shown in FIG. 9C, as the cardboard slide mount 10 continues moving in the direction of the arrow 124, the inner surface 32 of the cover 12 is carried up a ramped surface 128 of the wedge 110 so as to direct the outer edge 126 of cover 12 away from the edge 122 of the base 62. The cardboard slide mount 10 continues along the slide mount opening assembly 104 in the direction of the arrow 124 until the edge 126 of the cover 12 is resting on a surface 130 of the wedge 110.

FIG. 10 is an enlarged perspective view of cardboard slide mount 10 with the slide mount opening assembly 104 partially cut away to demonstrate the insertion of a film transparency. As shown in FIG. 10, with the edge 126 of the cover 12 resting on the surface 130, the insertion opening 100 is thereby exposed. A space 132, between the surface 130 and ledge 108, communicates with the insertion opening 100 to allow an individual film transparency to enter the insertion opening 100 and pass into the film nest 64.

FIG. 10A is an enlarged perspective view of the cardboard slide mount 10 of FIG. 10 with the slide mount opening assembly 104 partially removed. As shown in FIG. 10A, with the upper edge 126 of the cover 12 and the lower edge 122 of the base 62 separated, a film transparency 134 is able to pass through the insertion opening 100 and into the film nest 64. The inner edges 40A and 40B of the plastic brace 14 serve to guide the film transparency 134 into the film nest 64. The film transparency 134 is fully inserted into the film nest 64 when leading edge 136 of the film transparency 134 lies within a rear space 138 of the film nest 64.

Figure 10B:
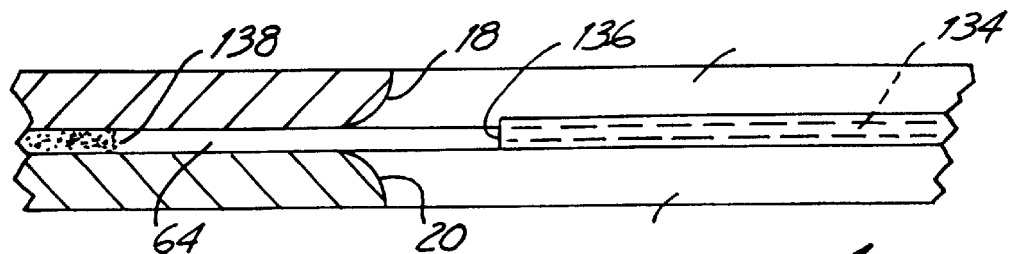
FIG. 10B is a greatly enlarged cross-sectional view of the slide mount of FIG. 10A taken along line 10B—10B.

FIG. 10B is a sectional view of cardboard slide mount 10 of FIG. 10A taken along line 10B—10B. As shown in FIG. 10B, the leading edge 136 of the film transparency 134 is guided into the rear space 138 of the film nest 64 by virtue of curved surfaces on the inner edges 18, 20 of the cover 12 and bottom 16. These curved surfaces assure that the leading edge 136 of the film transparency 134 does not bind upon entry into the rear space 138 of the film nest 64. Once the film transparency 136 is properly seated within the film nest 64, a small amount of pressure sufficient to activate secondary adhesive region 56 is applied to the film mount 10 to secure the cover 12 to the base 64, as described earlier with respect to FIG. 8, and an edge of film transparency 134 as well.

Figure 11:
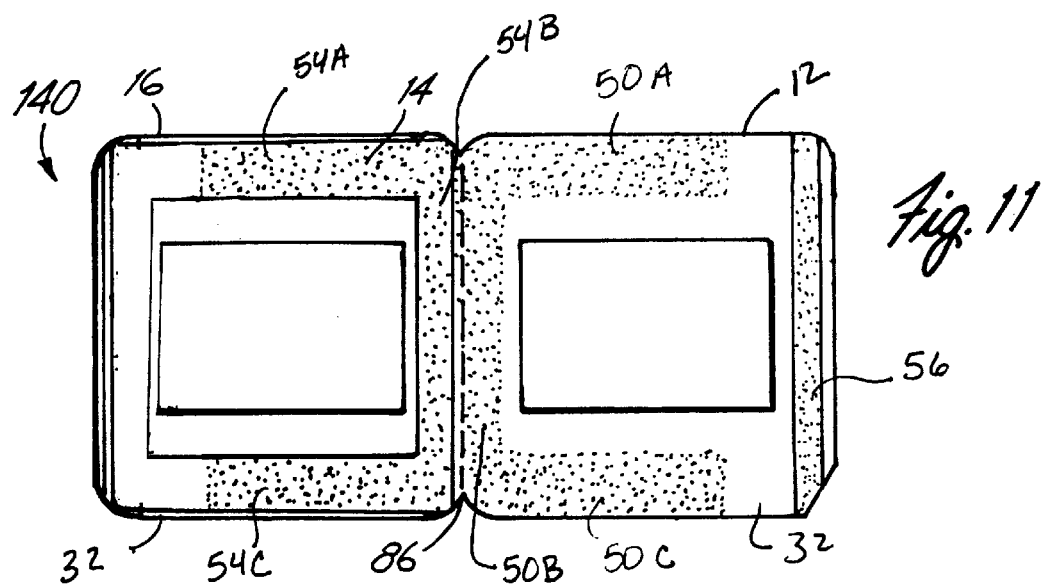
FIG. 11 is a top view of the slide mount of FIG. 10A with a cover of the slide mount partially cut away to show the film transparency sealed within the slide mount.

FIG. 11 is a partially assembled view of a slide mount 140, an alternative embodiment of slide mount 10 of FIG. 1. The slide mount 140 is in the butterfly configuration shown above in FIG. 7, with the cover 12 and bottom 16 being formed from a unitary piece of cardboard material with the fold line 86 dividing the cover 12 and bottom 16. Once the cover 12 is folded atop the plastic brace 14, a bonding agent applied to the cardboard slide mount 10 which bonds the inner surface 32 of the bottom 16 to the brace 14. In addition, the inner surface 32 of the cover 12 becomes partially bonded to the outer side of the plastic brace 14 about U-shaped patterns 50A–50C and 54A–54C. The secondary adhesive region 56 is not activated by the bonding agent, as a result, the cover 12 remains unbonded, but removably adhered, to the base 62 along the secondary adhesive region 56, which permits insertion of an individual film transparency into the film nest 64.

Figure 12:
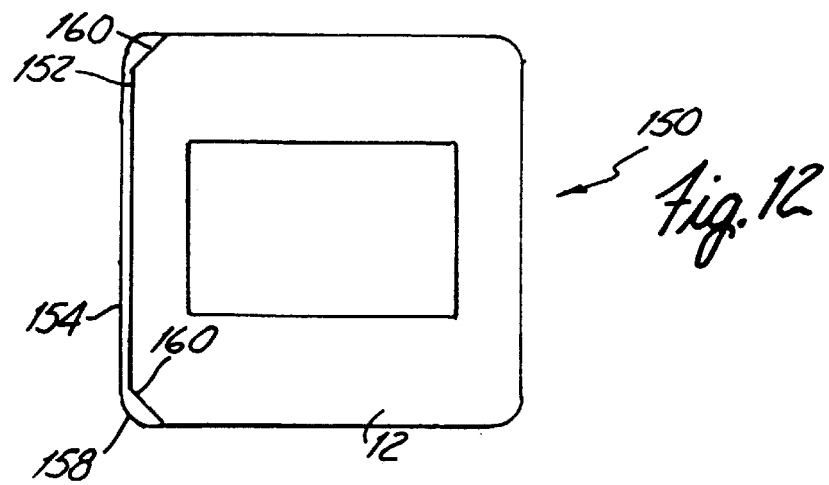
FIG. 12 is a partially assembled top view of the slide mount of FIG. 11 with an alternative assembly configuration.

FIG. 12 is a top view of another alternative embodiment of a slide mount 150. As shown in FIG. 12, an edge 152 of the cover 12 is slightly recessed from an edge 154 of the base 156. By recessing the edge 152, a corner 158 of the base 156 is able to pass into a slide mount opening assembly a greater distance before a wedge, similar to the wedge 110 of FIGS. 9A–9C, engages a corner 160 of the cover 12. By further delaying contact of the wedge 110 with the corner 160 of the cover 12, the corner 158 of the base 156 is deflected downward along the beveled edge 112 of the base 156 a greater distance, which decreases the opportunity for the cardboard slide mount 150 to become jammed as the wedge 110 engages the corner 160 of the cover 12. The cover 12 has two chamfered corners 160, which permits the cardboard slide mount 150 to be opened by a different direction of travel through an opening assembly.

The preferred embodiments illustrate a pre-closed slide mount incorporating the plastic brace of the present invention. Each pre-closed slide mount offers the desirable benefit of allowing a film transparency to be loaded into the slide mount through a side entrance, which is known to be a quicker and more efficient manner of preparing a slide mount. The side opening of the slide mount of the present invention is made possible by chamfering at least one corner of the cover of the slide mount to permit an opening assembly to quickly and effectively separate the edges of opposing sides of the slide mount without damage to the slide mount.

The inner edges of the slide mount are coated with a layer of plastic. This plastic layer increases the ease with which a film transparency can be introduced into the slide mount and further allows the slide mount to be assembled using plastic to plastic bonding methods. The plastic to plastic bonds created between the plastic brace and the plastic coating on the cover and bottom is a stronger and less reactive connection. It is also possible to use an adhesive to form one or more of the connections affixing the brace to the cover and bottom.

Because an edge of the film nest includes a secondary adhesive strip, a film transparency is secured along one edge within the film nest which holds the position of the film transparency within the slide mount, yet allows the film to expand and contract in response to extreme temperatures experienced by the slide mount within slide projectors.

The slide mount incorporating the plastic brace of the present invention is significantly less expensive than side-opening slide mounts formed entirely from plastic as are typically used in the industry. The cardboard-plastic slide mount of the present invention, however, is also stronger and more resilient than conventional slide mounts formed entirely of cardboard. The plastic brace also provides a better edge for guiding transparencies into pre-closed slide mounts. In addition to being used with pre-closed slide mounts as described herein, the plastic brace of the present invention may also be utilized in cardboard slide mounts which are closed about a film transparency whereby the plastic brace would provide increased strength and resiliency to the transparency and the mount.

Although the present invention has been described with reference to preferred embodiments, workers skilled in the art will recognize that changes may be made in form and detail without departing from the spirit and scope of the invention.

What is claimed is:

1. A slide mount comprising:
   a cardboard bottom comprising a first film window and a plastic coating on an inner surface, such that an outer surface of the cardboard bottom defines a cardboard surface and the inner surface of the cardboard bottom defines a plastic surface;
   a plastic brace bonded to the plastic coating on the inner surface of the bottom to form a base defining a film nest; and
   a cardboard cover comprising a second film window at least partially aligned with the first film window;
   wherein:
      the cardboard cover further comprises an inner surface which is affixed to the base to define an insertion opening along one side of the slide mount through which a film transparency can be inserted into the film nest; and
      the slide mount further comprises a chamfered outer edge on the cardboard cover adjacent the insertion opening and a radiused outer edge on the cardboard bottom adjacent the insertion opening.

2. The slide mount of claim 1 wherein the brace is bonded to the plastic coating on the inner surface of the bottom and the cover is affixed to the base with an adhesive.

3. The slide mount of claim 1 wherein the cardboard cover further comprises a plastic coating on the inner surface, such that an outer surface of the cardboard cover defines a cardboard surface and the inner surface of the cardboard cover defines a plastic surface.

4. The slide mount of claim 1 wherein the plastic brace is bonded to the plastic coating on the inner surface of the bottom and the cover is affixed to the base by bonding the base to the plastic coating on the inner surface of the cover.

5. The slide mount of claim 1 and further comprising a secondary adhesive region located on the cover at the insertion opening.

6. The slide mount of claim 1 wherein the plastic brace comprises an aperture which is larger than the first and second film windows.

7. The slide mount of claim 1 wherein the plastic brace has a thickness of about 0.008 millimeters.

8. A slide mount comprising:
   a cardboard cover comprising a first film window and a plastic coating on an inner surface, such that the inner surface of the cardboard cover defines a plastic surface and an outer surface of the cardboard cover defines a cardboard surface;
   a plastic brace bonded to the plastic coating on the inner surface of the cover defining a film nest; and
   a cardboard bottom comprising a second film window at least partially aligned with the first film window;
   wherein:
      the plastic brace is bonded to the cover to define an insertion opening along one side of the slide mount through which a film transparency can be inserted into the film nest; and
      the slide mount further comprises a chamfered outer edge on the cover adjacent the insertion opening, and a radiused outer edge on the cardboard bottom adjacent the insertion opening.

9. The slide mount of claim 8 wherein the cardboard bottom further comprises a plastic coating on an inner surface, such that the inner surface of the cardboard cover defines a plastic surface and an outer surface of the cardboard bottom defines a cardboard surface.

10. The slide mount of claim 9 wherein the plastic brace is bonded to the plastic coating on the inner surface of the cover and is bonded to the plastic coating on the inner surface of the bottom using an bonding agent to form plastic to plastic bonds.

11. The slide mount of claim 8 and further comprising an adhesive region located on the cover at the insertion opening.

12. The slide mount of claim 8 wherein the plastic brace is bonded to the plastic coating on the inner surface of the cover and the bottom is affixed to the cover and brace with an adhesive.

13. The slide mount of claim 8 wherein the plastic brace comprises an aperture which is larger than the first and second film windows.

14. The slide mount of claim 8 wherein the plastic brace has a thickness of about 0.008 millimeters.

15. A slide mount comprising:
   a cardboard bottom comprising a first film window and a plastic coating on an inner surface, such that the inner surface of the cardboard bottom defines a plastic surface and an outer surface of the cardboard bottom defines a cardboard surface;
   a cardboard cover comprising a second film window at least partially aligned with the first film window and a plastic coating on an inner surface; and
   a plastic brace bonded to the plastic coating on the inner surfaces of the bottom and the cover;
   wherein:
      the inner surface of the cover is bonded to the base to define an insertion opening along one side through which a film transparency can be inserted into the film nest; and
      the slide mount further comprises a chamfered outer edge on the cover adjacent the insertion opening and a radiused outer edge on the cardboard bottom adjacent the insertion opening.

16. The slide mount of claim 15 wherein the brace is bonded to the inner surface of the bottom to form a base defining a film nest.

17. The slide mount of claim 15 and further comprising an adhesive region located on the cover at the insertion opening.

18. The slide mount of claim 15 wherein the plastic brace comprises an aperture which is larger than the first and second windows.

19. The slide mount of claim 15 wherein the brace is bonded to the plastic coating on the inner surface of the cover and is bonded to the plastic coating on the inner surface of the bottom using a bonding agent to form a plastic to plastic bond.

20. The slide mount of claim 15 wherein the plastic brace has a thickness of about 0.008 millimeters.

21. A method of forming a slide mount, the method comprising:
   providing a cardboard bottom having a plastic coating on an inner surface, a cardboard outer surface, and a first film window;
   providing a cardboard cover having a plastic coating on an inner surface, a cardboard outer surface, and a second film window;
   bonding a plastic brace to plastic coating on the inner surface of the cardboard bottom to form base defining a film nest; and bonding the cardboard cover to the base so as to at least partially align the first and second film windows;

wherein bonding the cardboard cover to the plastic brace comprises forming an insertion opening between the cover and base through which a film transparency can be inserted, and the method further comprises forming a chamfered outer edge on the cover adjacent the insertion opening and a radiused outer edge on the bottom adjacent the insertion opening.

22. The method of claim 21 wherein providing a cardboard bottom having a first film window includes:

cutting through a cardboard sheet of material from the inner surface to an outer surface to form the first film window having beveled edges.

23. The method of claim 21 wherein providing a cardboard cover includes:

cutting through a cardboard sheet from the inner surface to an outer surface to form the second film window having beveled edges.

24. The method of claim 21 further comprising applying an adhesive region to the cover at the insertion opening.

25. The method of claim 21 and further comprising inserting a film transparency into the film nest through the insertion opening.

26. The method of claim 21 and further comprising forming the plastic brace, wherein forming the plastic brace comprises:

providing a sheet of plastic; and cutting an aperture which is larger than the first and second windows through the sheet of plastic.

27. The method of claim 21 wherein bonding the plastic brace to the bottom and bonding the cover to the base comprises forming a plastic to plastic bond using a bonding agent.

28. The method of claim 21 wherein bonding the plastic brace to the bottom and bonding the cover to the base comprises forming a plastic to plastic bond using ultrasonic welding.

29. The method of claim 21 wherein providing a cardboard bottom having a plastic coating on an inner surface and a first film window and providing a cardboard cover having a plastic coating on an inner surface and a second film window comprises:

cutting a pair of side-by-side windows in a sheet of cardboard;

scoring the sheet of cardboard between the pair of side-by-side windows to create a fold line; and folding the sheet of cardboard about the fold line.

30. The method of claim 29 and further comprising providing an adhesive region on a side of one of the side-by-side windows.

* * * * *